US005359979A

United States Patent [19]

Anfinson et al.

[11] Patent Number: 5,359,979

[45] Date of Patent: Nov. 1, 1994

[54] MAGNETIC FUEL CONDITIONER

[75] Inventors: Mike Anfinson; Ron Chavarria, both of San Clemente, Calif.

[73] Assignee: Environments 2000, San Clemente, Calif.

[21] Appl. No.: 219,638

[22] Filed: Mar. 29, 1994

[51] Int. Cl.$^5$ ............................ F15C 1/04; C02F 1/48

[52] U.S. Cl. ............................ 123/538

[58] Field of Search ............... 123/536, 537, 538, 539; 201/222, 695

[56] References Cited

U.S. PATENT DOCUMENTS

| | | | |
|---|---|---|---|
| 4,414,951 | 11/1983 | Saneto | 123/536 |
| 4,461,262 | 7/1984 | Chow | 123/538 |
| 4,711,271 | 12/1987 | Weisenbarger et al. | 123/538 |
| 4,755,288 | 7/1988 | Mitchell et al. | 123/538 |
| 5,055,188 | 10/1991 | Johnston et al. | 123/538 |
| 5,063,368 | 11/1991 | Ettehadieh | 123/538 |
| 5,124,045 | 6/1992 | Janczak et al. | 123/538 |
| 5,127,385 | 7/1992 | Dalupin | 123/538 |
| 5,161,512 | 11/1992 | Adam et al. | 123/538 |
| 5,197,446 | 3/1993 | Daywalt et al. | 123/538 |
| 5,320,751 | 6/1994 | Burns | 123/538 |

*Primary Examiner*—Raymond A. Nelli
*Assistant Examiner*—M. Macy
*Attorney, Agent, or Firm*—Blakely, Sokoloff, Taylor & Zafman

[57] ABSTRACT

A magnetic focusing fuel treating assembly coupled to the fuel line of an internal combustion engine. The assembly includes a ferromagnetic plug that extends through the inner hole of an annular permanent magnet. The plug and the magnet are separated by a precise annular gap. Attached to the magnet and located at the ends of the plug are a pair of ferromagnetic end plates. The magnet emits a focused, concentrated magnetic field that flows into the fuel. The focused magnetic field has been found to improve the performance of the engine, demonstrated by improved fuel economy and reduced emissions.

25 Claims, 2 Drawing Sheets

MAGNETIC FUEL CONDITIONER

BACKGROUND OF THE INVENTION

1. Field of the_Invention

The present invention relates to a magnetic device that exposes the fuel of an internal combustion engine to a focused magnetic field.

2. Description of Related Art

It is known that exposing a fluid to a magnetic field can change the characteristics of the fluid. For example, a magnetic field applied to water running through a pipe has been found to reduce the amount of calcium-carbonate residue on the interior of the pipe. It has also been found that applying a magnetic field to the fuel of an internal combustion engine can increase the performance of the engine, resulting in an improved fuel economy and reduced emissions.

U.S. Pat. No. 5,171,487 issued to Hudz and U.S. Pat. No. 4,381,754 issued to Heckel, disclose electromagnetic devices that apply a magnetic field to the fuel of an internal combustion engine. The Hudz and Heckel devices both contain coils that carry current and emanate a magnetic flux into the fuel. As stated in the Heckel reference, introducing the fuel to a magnetic field increases the fuel efficiency of the engine from 15% to 30%. Although both the Heckel and Hudz references both disclose an apparatus that applies a magnetic field to the fuel, these devices require coils and a source of current that increase the production and operating cost of the engine.

U.S. Pat. No. 4,469,076 issued to Wolff; U.S. Pat. No. 5,059,743 issued to Sakuma; U.S. Pat. No. 5,127,385 issued to Dalupin; U.S. Pat. No. 4,461,262 issued to Chow; U.S. Pat. No. 5,161,512 issued to Adam et al. and U.S. Pat. No. 4,755,288 issued to Mitchell et al., all disclose fuel treating devices that contain one or more permanent magnets. The magnets are attached to the outside of a fuel line and are magnetized so that the magnetic field passes through the fuel. Although these prior art devices apply a magnetic field to the fuel, the location, configuration and magnetization of the magnets creates a relatively inefficient flux path. It would be desirable to provide a magnetic fuel treating device that efficiently applies a magnetic field to the fuel to induce a more complete combustion by increasing the available oxygen sites.

SUMMARY OF THE INVENTION

The present invention is a magnetic focusing fuel treating assembly coupled to the fuel line of an internal combustion engine. The assembly includes a ferromagnetic plug that extends through the inner hole of an annular permanent magnet. The plug and the magnet are separated by a precise annular gap. Attached to the magnet and located at the ends of the plug are a pair of ferromagnetic end plates. The magnet emits a focused, concentrated magnetic field that flows into the fuel. The focused magnetic field has been found to improve the performance of the engine, demonstrated by improved fuel economy and reduced emissions.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
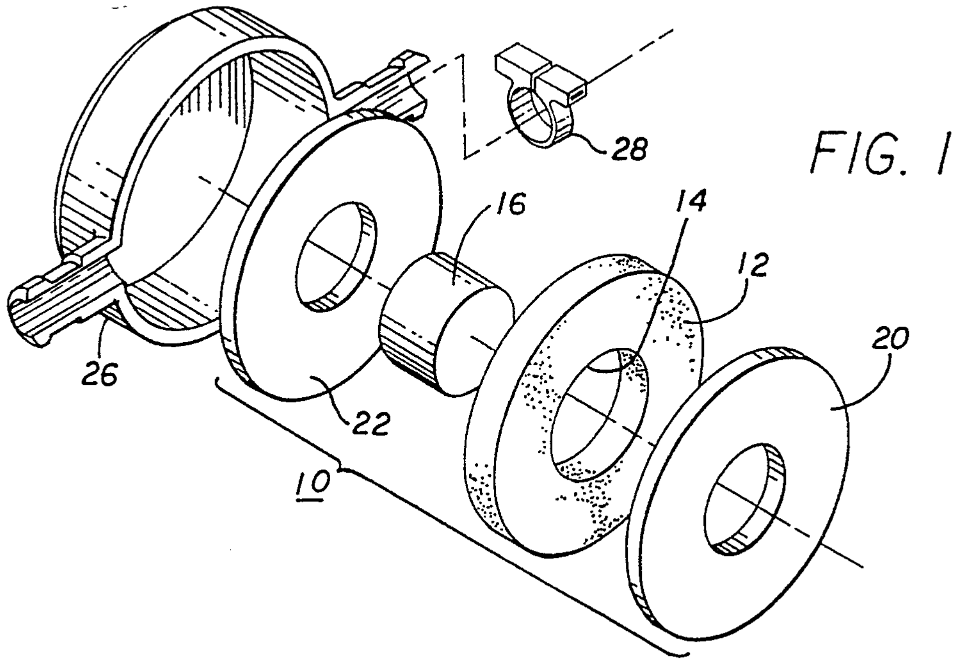
FIG. 1 is an exploded view of a magnetic fuel treating assembly of the present invention.

Referring to the drawings more particularly by reference numbers, FIG. 1 shows a magnetic fuel treating assembly 10 of the present invention. The assembly 10 includes an annular permanent magnet 12 that has an inner hole 14. Extending through the inner hole 14 of the magnet 12 is a plug 16. The plug 16 has an outer diameter that is smaller than the inner diameter of the magnet 12, so that there is created an annular gap 18 between the two members. The device 10 also has a pair of end caps 20 and 22 attached to the magnet 12 and located at the ends of the plug 16.

In the preferred embodiment, the magnet 12 is a Ceramic 5 magnet that is 0.280 inches long, with an outer diameter of 2.100 inches and an inner diameter of 0.937 inches. The Ceramic 5 magnet 12 has a maximum energy of 3.4, a residual induction of 3,800 kilogaus, a coercive force of 2,400 oersteds and an intrinsic force of 2,500 oersteds. The plug 16 is preferably constructed from a ferromagnetic material such as a non-leaded steel, that has a length of 0.500 inches and an outer diameter of 0.812 inches. The 0.812 inch diameter creates a gap 18 that has a width of 0.0625 inches. The end plates 20 and 22 are also preferably constructed from a non-leaded steel. End plate 20 preferably has a thickness of 0.110 inches, an outer diameter of 2.100 inches and an inner diameter of 0.937 inches. End plate 22 preferably has a thickness of 0.110 inches, an outer diameter of 2.100 inches and an inner diameter of 0.812 inches. The plug 16 is secured to the inner diameter of end plate 22.

Figure 2:
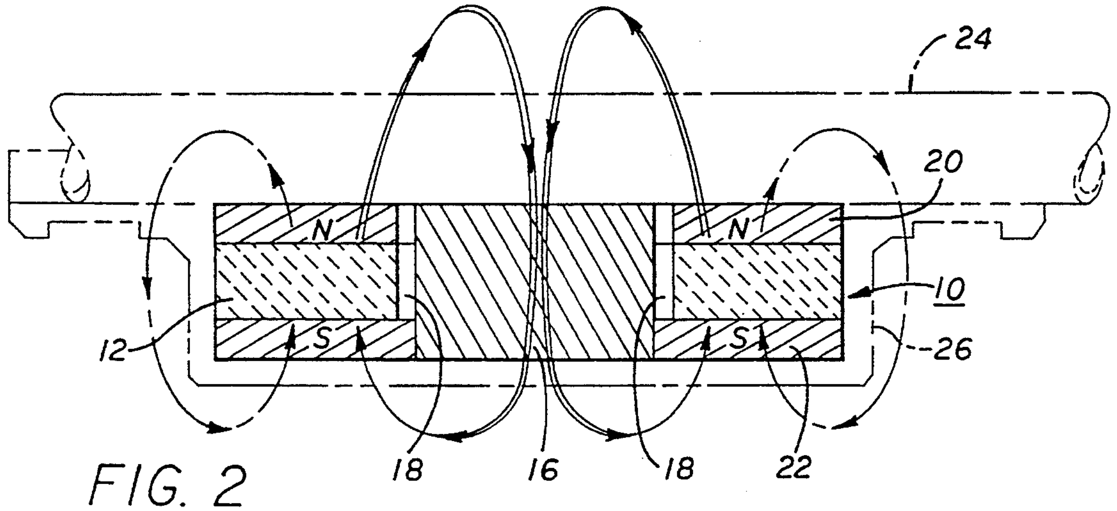
FIG. 2 is a cross-sectional view showing the magnetic field of the fuel treating assembly.

FIG. 2 shows the magnetic field of the magnetic assembly 10. The surface of the magnet 12 adjacent to the end plate 20 is polarized with one (N) polarity and the magnet surface adjacent to the end plate 22 is polarized with an opposite (S) polarity. The magnetic field flows from the N pole to the S pole. The presence of the plug 16 concentrates the field toward the center of the assembly. The existence of the gap 18 increases the path of the magnetic field away from the magnet. The result is a focused relatively high density magnetic field that flows from the middle of the assembly 10.

Figure 3:
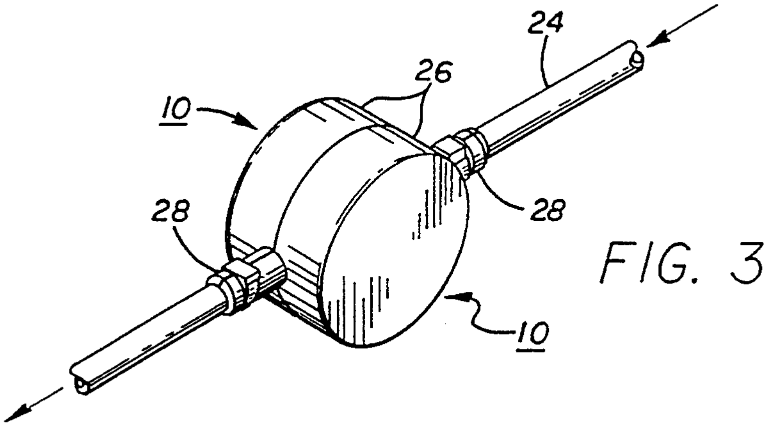
FIG. 3 is a perspective view of a pair of magnetic assemblies coupled to the fuel line of an internal combustion engine.

FIG. 3 shows a pair of magnet assemblies 10 coupled to a fuel line 24 of an internal combustion engine. The assemblies are preferably mounted to housing members 26. The housing members 26 are fastened to the fuel line 24 by a pair of clamps 28. The magnetic assemblies 12 emit magnetic fields that flow through the fuel line 24 and into the fuel. The magnetic assemblies 10 of the present invention provide concentrated field lines that have been found to improve the characteristics of the engine.

Figure 4:
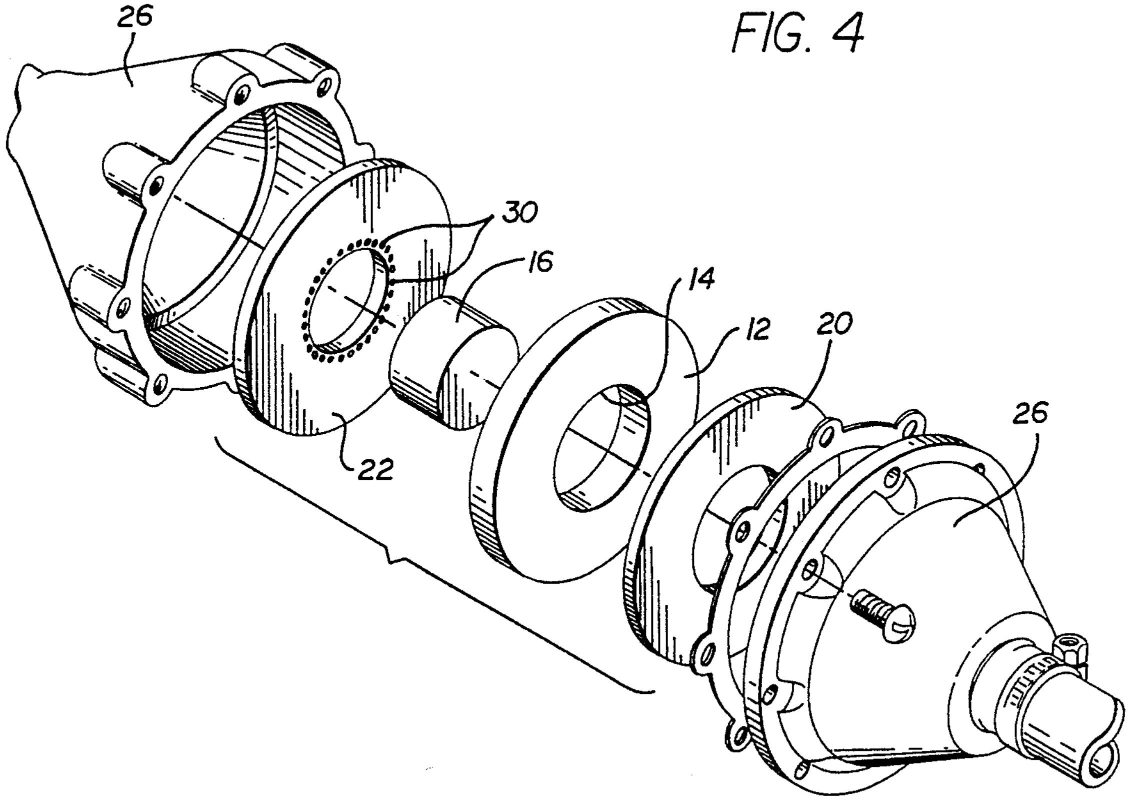
FIG. 4 is an exploded view of an alternate magnetic fuel treating assembly.
Figure 5:
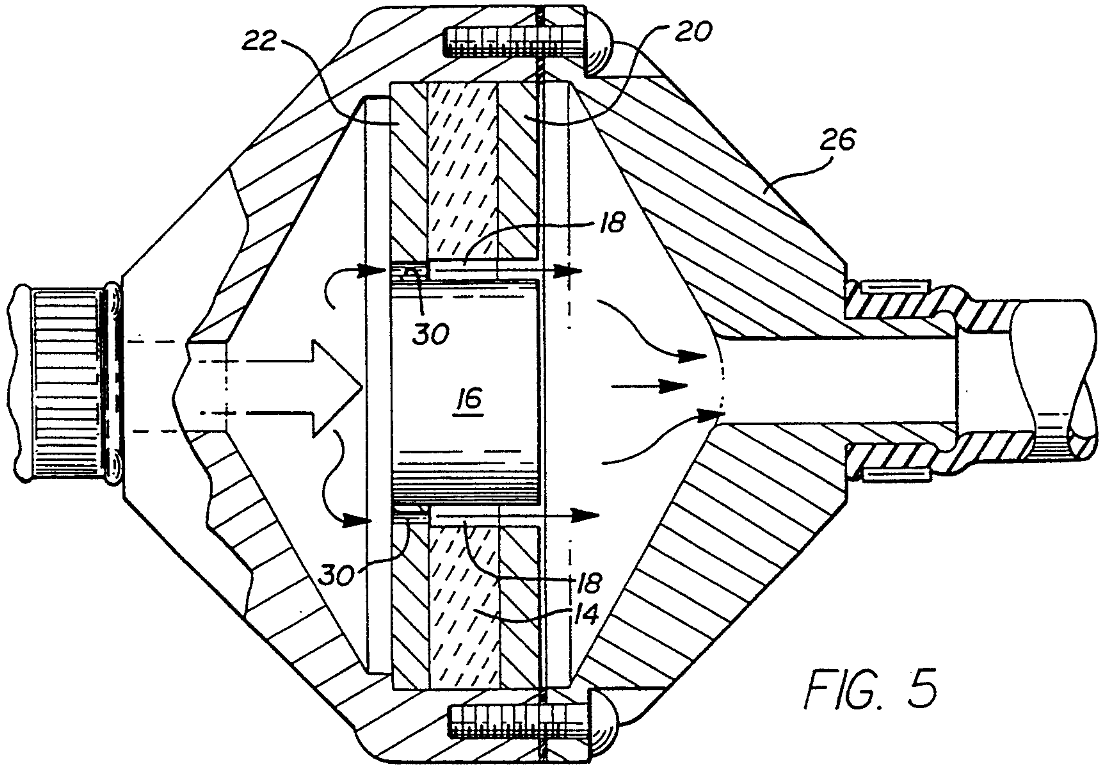
FIG. 5 is a side view showing the alternate magnetic fuel treating assembly located within a fuel line.

FIGS. 4 and 5 show a magnetic assembly 10' located within the fuel line 24. The end plate 22 will have a plurality of holes 30 to allow fuel to flow through the gap 18 of the assembly. In the preferred embodiment, the end plate 22 would have 30 1/16 inch holes 30. Placing the assembly 10' within the fuel line 24 has been found to improve the performance and reduce the emissions of an internal combustion engine relative to locating the assembly 10 outside of the fuel line 24.

The following Example illustrates an actual test of a pair of assemblies 10 attached to the outside of a fuel line of an internal combustion engine.

EXAMPLE I

A Super flow 901 C computerized engine dynamometer was used to evaluate the effectiveness of the magnetic assemblies 10. The engine used for evaluation was a 350 Ford V8 Windsor equipped with EEC-4 fuel injection, Crane Fireball cylinder heads, Crane hydraulic roller cam and Ford Gt40 intake manifolds. The fuel was a 101 octane racing fuel.

The engine operated at 2500 revolutions per minute (RPM). The engine oil temperature was heated to 145° F. before any test data was recorded. The engine was tested with and without the device. Nine to eleven measurements were taken 5 seconds apart for an engine running without the assemblies 10. Nine to eleven measurements were then taken, again 5 seconds apart, for an engine operating with the assemblies 10. The test was conducted three separate times in the same day. No intervening engine adjustments or test runs were performed between trials. The results of the test runs are provided below in tabulated form.

constructions and arrangements shown and described, since various other modifications may occur to those ordinarily skilled in the art.

What is claimed is:

1. A magnetic fuel treating assembly coupled to a fuel line of an internal combustion engine, comprising:

an annular permanent magnet that has an inner hole; and, a ferromagnetic plug that extends through said inner hole of said annular permanent magnet acting to maximize the flux density through the fuel passing therethrough.

2. The assembly as recited in claim 1, further comprising a pair of end plates that are attached to said annular permanent magnet.

3. The assembly as recited in claim 1, wherein said annular permanent magnet is constructed from ceramic.

4. The assembly as recited in claim 1, wherein said plug is constructed from a ferromagnetic material.

5. The assembly as recited in claim 1, wherein said plug is separated from said annular permanent magnet by a gap.

6. The assembly as recited in claim 2, wherein said plug has a diameter of approximately 0.8 inches, and said annular permanent magnet has an outer diameter of approximately 2.1 inches and a residual induction of 3800 kilogauss.

7. A magnetic fuel treating assembly coupled to a fuel line of an internal combustion engine, comprising:

TABLE I

| | TORQUE Lb/Ft | HP | VE % | ME % | FA-FB Lb/Hr | A1 SCFM | A/F | BSFC Lb/Hp/Hr | BSAC Lb/Hp/Hr |
|---|---|---|---|---|---|---|---|---|---|
| WITHOUT DEVICE | 110.0 | 52.6 | 36.8 | 64.4 | 22.6 | 84.9 | 17.4 | .52 | 8.46 |
| WITH DEVICE | 125.1 | 62.0 | 41.5 | 67.0 | 25.4 | 99.0 | 18.0 | .47 | 8.38 |
| % OF CHANGE | 14 | 18 | 13 | 3 | 12 | 17 | 3 | −10 | −1 |

TABLE II

| | TORQUE Lb/Ft | HP | VE % | ME % | FA-FB Lb/Hr | A1 SCFM | A/F | BSFC Lb/Hp/Hr | BSAC Lb/Hp/Hr |
|---|---|---|---|---|---|---|---|---|---|
| WITHOUT DEVICE | 106.4 | 50.6 | 35.8 | 63.4 | 25.3 | 81.5 | 14.9 | .58 | 8.56 |
| WITH DEVICE | 120.4 | 60.7 | 38.2 | 65.4 | 26.3 | 92.7 | 16.2 | .50 | 8.08 |
| % OF CHANGE | 13 | 20 | 7 | 3 | 4 | 15 | 9 | −14 | −6 |

TABLE III

| | TORQUE Lb/Ft | HP | VE % | ME % | FA-FB Lb/Hr | A1 SCFM | A/F | BSFC Lb/Hp/Hr | BSAC Lb/Hp/Hr |
|---|---|---|---|---|---|---|---|---|---|
| WITHOUT DEVICE | 101.7 | 48.4 | 34.5 | 62.1 | 22.8 | 78.2 | 15.9 | .55 | 8.70 |
| WITH DEVICE | 134.0 | 70.9 | 41.4 | 67.4 | 29.5 | 104.7 | 16 | .48 | 7.83 |
| % OF CHANGE | 32 | 46 | 20 | 8.5 | 29 | 34 | 3 | −13 | −10 |

Where;

HP=frictional horsepower;

VE=Volumetric efficiency (air);

ME=mechanical efficiency;

FA-FB=fuel flow;

AF=air to fuel ratio;

A1=air flow;

BSFC=brake specific fuel consumption;

BSAC=brake specific air consumption;

As shown in the Tables, the power and fuel efficiency of the engine improve when the assemblies of the present invention are attached to the fuel line.

While certain exemplary embodiments have been described and shown in the accompanying drawings, it is to be understood that such embodiments are merely illustrative of and not restrictive on the broad invention, and that this invention not be limited to the specific an annular permanent magnet that has an inner hole;

a ferromagnetic plug that extends through said inner hole of said annular permanent magnet acting to maximize the flux density through the fuel passing therethrough, said plug being separated from said annular permanent magnet by a gap; and, a pair of end caps attached to said annular permanent magnet.

8. The assembly as recited in claim 7, wherein said annular permanent magnet is constructed from ceramic.

9. The assembly as recited in claim 8, wherein said plug and said end caps are constructed from a ferromagnetic material.

10. The assembly as recited in claim 9, wherein said plug has a diameter of approximately 0.8 inches, and said annular permanent magnet has an outer diameter of approximately 2.1 inches and a residual induction of 3800 kilogauss.

11. A magnetic treating assembly for an internal combustion engine, comprising:

a fuel line;

an annular permanent magnet coupled to said fuel line, said annular permanent magnet having an inner hole; and, a ferromagnetic plug that extends through said inner hole of said annular permanent magnet acting to maximize the flux density through the fuel passing therethrough.

12. The assembly as recited in claim 11, further comprising a pair of end plates that are attached to said annular permanent magnet.

13. The assembly as recited in claim 11, wherein said annular permanent magnet is constructed from ceramic.

14. The assembly as recited in claim 11, wherein said plug is constructed from a ferromagnetic material.

15. The assembly as recited in claim 11, wherein said plug is separated from said annular permanent magnet by a gap.

16. The assembly as recited in claim 11, wherein said plug has a diameter of approximately 0.8 inches, and said annular permanent magnet has an outer diameter of approximately 2.1 inches and a residual induction of 3800 kilogauss.

17. A fuel line assembly for an internal combustion engine, comprising:

a fuel line with an outer surface;

a magnet assembly mounted to said outer surface of said fuel line, said magnet assembly including;

an annular permanent magnet that has an inner hole;

a ferromagnetic plug that extends through said inner hole of said annular permanent magnet acting to maximize the flux density through the fuel passing therethrough, said plug being separated from said annular permanent magnet by a gap; and, a pair of end plates attached to said annular permanent magnet.

18. The assembly as recited in claim 17, wherein said annular permanent magnet is constructed from ceramic.

19. The assembly as recited in claim 18, wherein said plug and said end caps are constructed from a ferromagnetic material.

20. The assembly as recited in claim 19, wherein said plug has a diameter of approximately 0.8 inches, and said annular permanent magnet has an outer diameter of approximately 2.1 inches and a residual induction of 3800 kilogauss.

21. A fuel line assembly for an internal combustion engine, comprising:

a fuel line that has an inner channel;

a magnet assembly located within said inner channel of said fuel line, said magnet assembly including;

an annular permanent magnet that has an inner hole;

a ferromagnetic plug that extends through said inner hole of said annular permanent magnet acting to maximize the flux density through the fuel passing therethrough, said plug being separated from said annular permanent magnet by a gap; and, a pair of end plates attached to said annular permanent magnet.

22. The assembly as recited in claim 21, wherein said annular permanent magnet is constructed from ceramic.

23. The assembly as recited in claim 22, wherein said plug and said end caps are constructed from a ferromagnetic material.

24. The assembly as recited in claim 23, wherein said plug has a diameter of approximately 0.8 inches, and said annular permanent magnet has an outer diameter of approximately 2.1 inches and a residual induction of 3800 kilogauss.

25. The assembly as recited in claim 22, wherein one of said end caps has a plurality of holes.

* * * * *